United States Patent [19]

Shields

[11] 4,452,350
[45] Jun. 5, 1984

[54] EXTRACTOR AND TRANSFER MECHANISM

[75] Inventor: Ronald Shields, Alexandria, Ind.

[73] Assignee: Lynch Corporation, Anderson, Ind.

[21] Appl. No.: 344,648

[22] Filed: Feb. 1, 1982

[51] Int. Cl.³ ............................................. B65G 47/26
[52] U.S. Cl. .................................... 198/424; 198/431; 414/222; 414/758
[58] Field of Search ............... 414/749, 750, 752, 758, 414/773, 222, 589, 33; 198/424, 431, 486, 483, 403

[56] References Cited

U.S. PATENT DOCUMENTS

| | | | |
|---|---|---|---|
| 1,316,160 | 9/1919 | Johnson | 198/431 |
| 2,018,057 | 10/1935 | Donner | 198/431 |
| 3,656,634 | 4/1972 | Pearne et al. | 414/33 |
| 3,948,385 | 4/1976 | Shinomiya | 198/403 |
| 4,189,137 | 2/1980 | Denney et al. | 414/752 X |
| 4,289,441 | 9/1981 | Inaba et al. | 414/751 X |

*Primary Examiner*—Robert J. Spar
*Assistant Examiner*—Donald W. Underwood
*Attorney, Agent, or Firm*—Allegretti, Newitt, Witcoff & McAndrews, Ltd.

[57] ABSTRACT

The present invention relates to a mechanism which is automatically operable for removing articles from a single work station, inverting the articles and transporting them in groups of plural pieces aligned in a row.

13 Claims, 6 Drawing Figures

EXTRACTOR AND TRANSFER MECHANISM

BACKGROUND OF THE INVENTION

A mechanism which removes an article from one work station transports the article to a second work station is a piece of equipment highly desired in the manufacturing field. More particularly, the manufacture of glass insulators for high-tension lines requires the tempering of the insulators at one location with subsequent transport to a second location for water quenching. At the tempering station, the articles are held by a carousel member which moves the articles through a tempering furnace. Once tempered, the articles must be lifted from the carousel member and then moved to a work station for quenching. The insulators are to be inverted prior to moving into the quenching station.

It would be highly desirable to provide a mechanism which can automatically remove tempered insulators from a moving carousel member and then invert the removed articles and finally transport the inverted articles to the next work station. The mechanism must operate in time relation to the movement of the tempering carousel.

It is therefore an object of the present invention to provide an improved mechanism for transporting work articles from one work station to a next.

It is yet another object of the present invention to provide a transport mechanism which inverts articles upon their removal from a work station prior to transport of the articles to another work station.

It is a more specific object of the present invention to provide an extractor/transfer mechanism for removing glass insulators from a tempering carousel, inverting the insulators and for placing the insulators in rows for movement to a next work station.

SUMMARY OF THE INVENTION

These and other objects of the invention are achieved in a carriage which moves a vacuum lift member for transport of a work article from a first station to a second. An inverter member disposed along the path of carriage movement receives a work article from the lift member and inverts the article onto a moving conveyor. The carriage and inverting member are driven in time relation which may be initiated in relation to the movement of articles within the first work station.

DESCRIPTION OF THE PREFERRED EMBODIMENT

Figure 1:
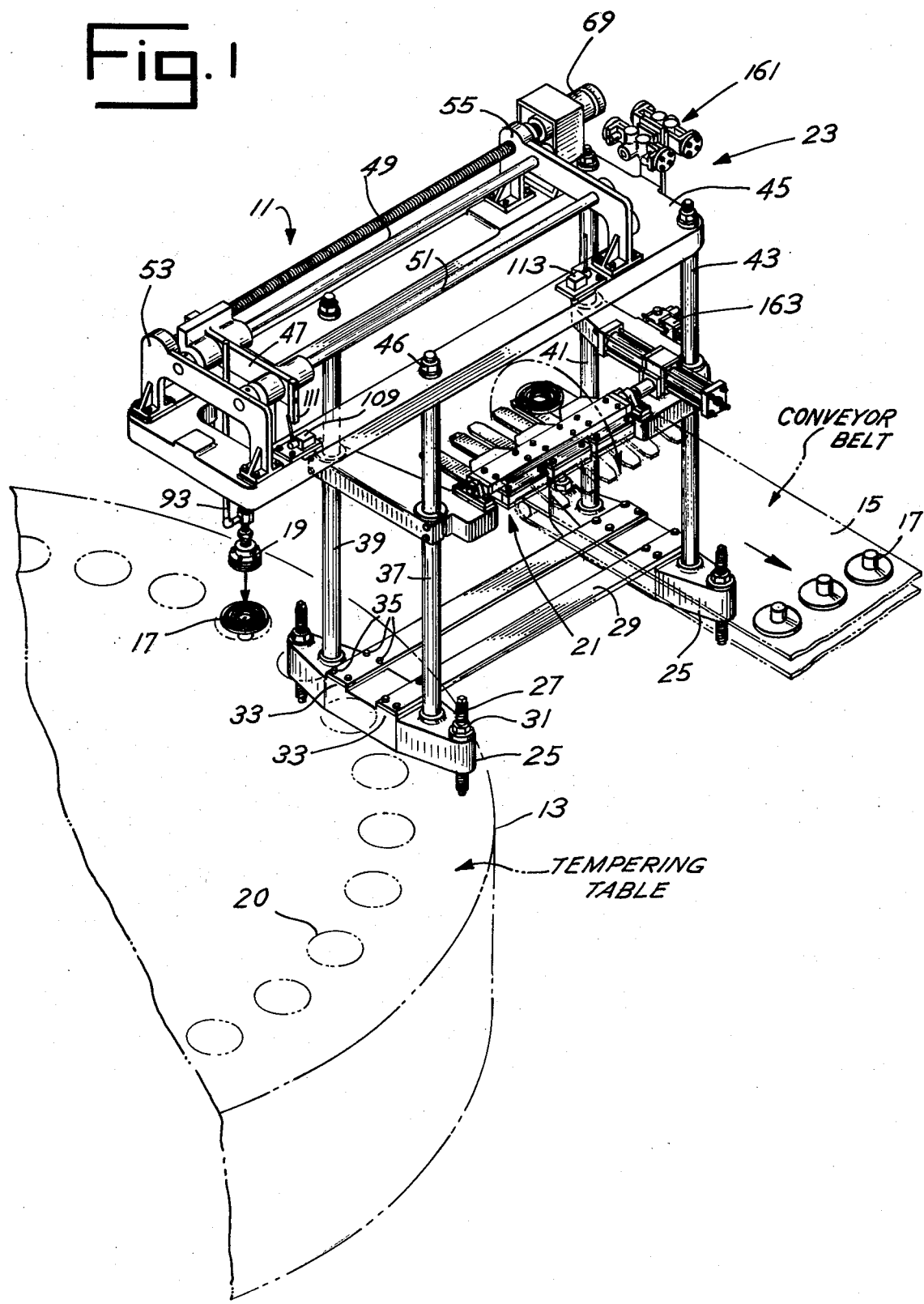
FIG. 1 is a perspective view of an embodiment of the extractor and transfer mechanism of the present invention.

Referring to FIG. 1, an extractor/transfer mechanism 11 is operable for removing articles, namely, carousel table 13. Once extracted, the articles are positioned in rows onto a conveyor belt 15 for transport to another work station. Three such articles 17 are illustrated in position on the conveyor belt.

A vacuum lift mechanism 19 lifts the article from nests 20 formed in table 13 and moves the article radially outward away from the table. The article is moved onto an air turnover mechanism 21 which rotates 190° to transfer the article onto conveyor 15.

Vacuum lift 19 and air turnover mechanism 21 are positioned in a fixed spatial relationship with respect to one another by a frame structure generally indicated by reference numeral 23. The frame structure includes a pair of feet support portions 25 which rest on the ends of a pair of threaded support rods 27 for each portion 25. Rods 27 are threadably movable through portions 25 in order to permit leveling adjustment of the portions 25 with respect to the horizontal. The two portions 25 are interconnected by a pair of support beams 29 which are screw secured to the top of each portion 25 as shown.

Feet support portions 25 are cast from metal in the shape as shown and are machined to include threaded holes for receiving support rods 27. A hexagon nut 31 may be threaded onto the support rods and tightened against support portion 25, holding rods 27 in place. The support portions are further cast to provide a pair of raised portions 33 which are machined flat to provide a surface for receiving support beams 29. Portions 33 are machined to include four threaded holes for receiving bolts 35 to secure the support beams to portions 25.

Upstanding from feet support portions 25 are four cylindrical legs members 37, 39, 41 and 43 for supporting a carriage platform 45 at a distance above portions 25. Each leg member 37-43 is threaded at its ends for passing through support portions 25 and platform 45. Nuts 46 are used to hold platform 45 atop leg members 37-43 and likewise nuts (not shown) are threaded onto the opposite ends of the leg members from underneath portions 25 for holding the leg members fixed to the support portions.

Platform 45 is generally rectangular in shape having its center opened to permit movement of lift 19 from one end of the opening to the other. Platform 45 extends outwardly a distance to one side of leg members 37, 39, for permitting lift 19 to move above table 13.

Platform 45 supports a carriage 47 for movement of vacuum lift 19 relative to platform 45. Carriage 47 is slidably supported by a pair of cylindrical guide rods 49, 51. A pair of rod support members 53, 55 are screw secured at respective ends of platform 45, as shown, for supporting guide rods 49, 51 in a parallely spaced relationship.

Figure 2:
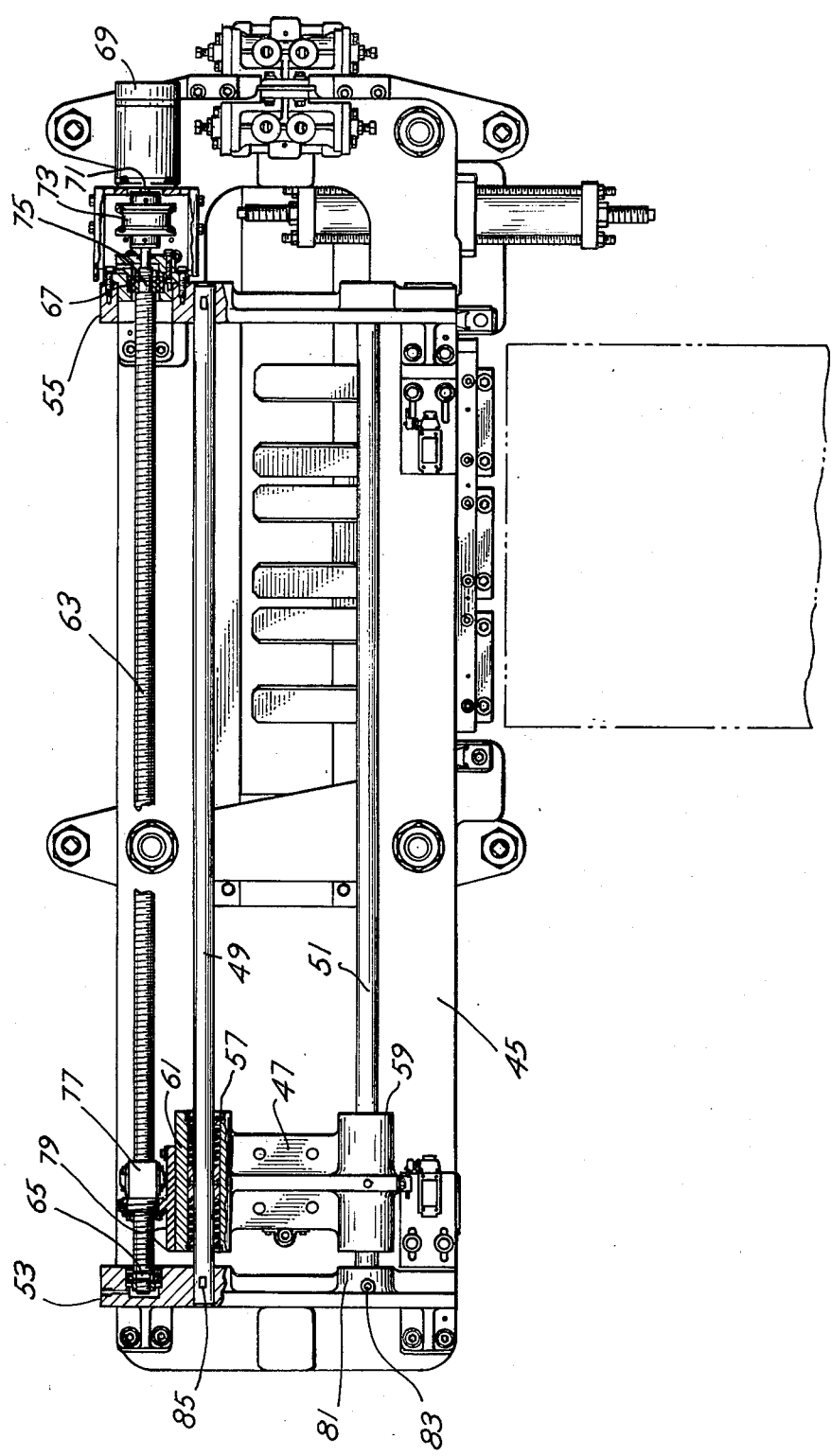
FIG. 2 is a top view of the extractor and transfer mechanism of FIG. 1.

As shown in more detail in FIG. 2, carriage 47 includes a pair of hollow cylindrical followers 57, 59 through which pass guide rods 49, 51. A bearing surface 61, formed of ball bushings on the inside surface of followers 57, 59, permit the followers to slide along rods 49, 51 as the carriage is moved. A ball screw shaft 63 is parallely spaced to the outside of guide rod 49 for controlling movement of the carriage. Shaft 63 is rotatably mounted in rod support members 53, 55 by conventional bearing cages 65, 67. A stepping motor 69 rotates shaft 63. A motor shaft 71 of stepping motor 69 is secured to a flexible coupler 73 for permitting flexing on start up. Coupler 73 is coupled to the end 75 of ball screw 63. As stepping motor 69 rotates, ball screw 63 turns in unison with the motor.

A carriage driver 77 is threaded onto ball screw shaft 63 for movement along the axis of the shaft as the shaft is rotated. Driver 77 is bolted securely to carriage 47 by a connector member 79. As stepping motor 69 rotates, driver 77 moves along the axis of shaft 63 driving carriage 47 along guide bars 49, 51.

Rod support members 53, 55 are cast to include hollowed boss portions 81 for receiving an end of each of guide rods 49, 51. A bolt 83 is threaded into the top of portions 81 for entering a rod slot 85 formed in the ends of rods 49, 51 in order to maintain guide rods 49, 51 in a fixed position in the frame structure.

Figure 3:
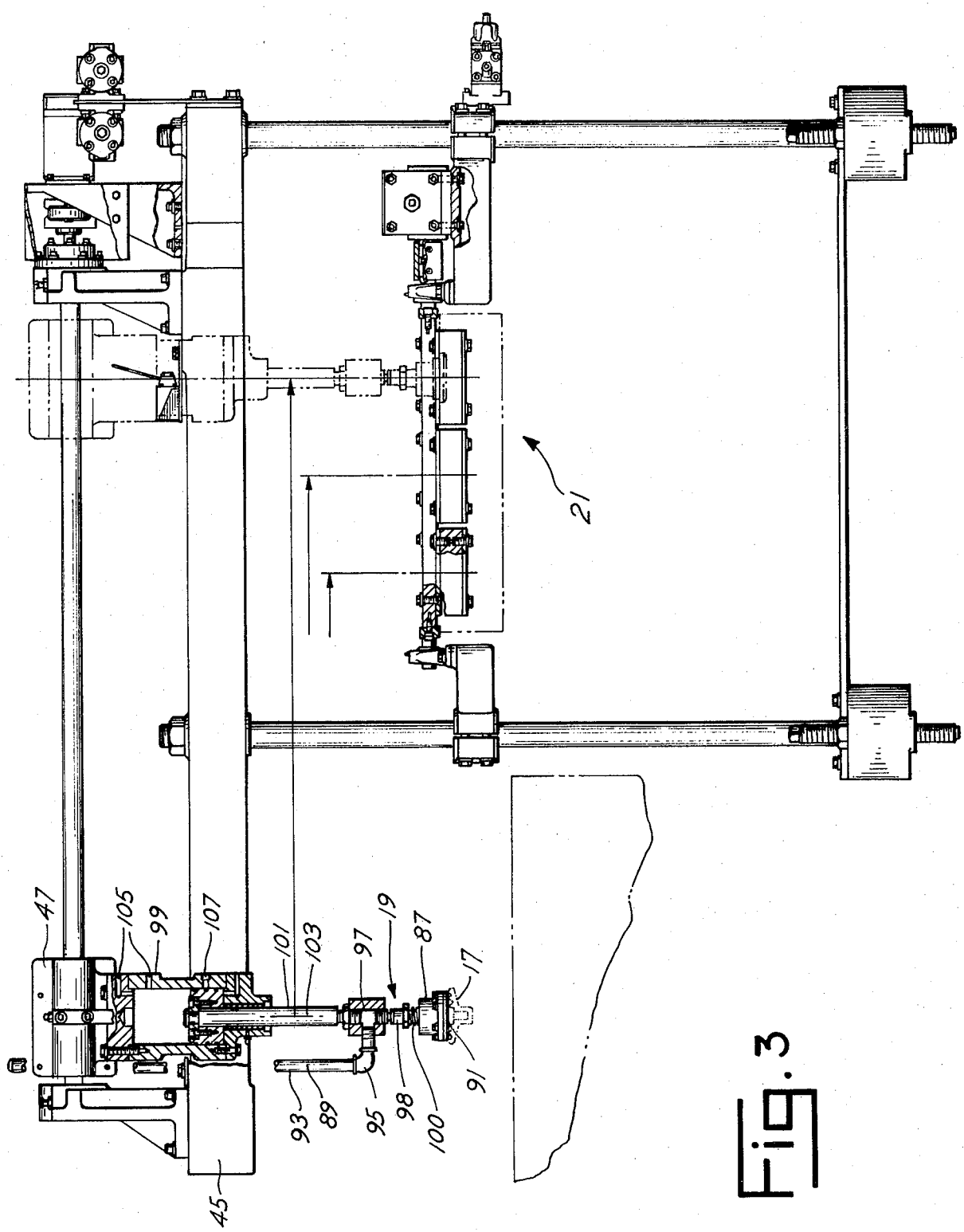
FIG. 3 is a side view of the extractor and transfer mechanism of FIG. 1.

Referring to FIG. 3, lift mechanism 19 depends from carriage 47, passing through the opening in platform 45. A vacuum head 87 is secured at the distal end of lift mechanism 19. A vacuum passageway 89 is connected to vacuum head 87 for providing suction along its lower surface 91 in order to suck article 17 to the lower surface for lifting the article from table 13. Lower surface 91 may be formed of a sealing material and may have a series of small holes for providing the vacuum suction.

Passageway 89 is formed by a pipe 93 leading to a vacuum source (not shown). As shown in FIG. 1, pipe 93 passes upward above carriage 47 from where a flexible hosing (not shown) connects pipe 93 to the vacuum source. The flexible hosing permits carriage 47 to move along its path. The vacuum source may be positioned on support beams 29, if desired.

Pipe 93 is connected to an elbow 95 which in turn is connected to a T-pipe 97. The lower end of T-pipe 97 is connected to vacuum head 87 by a piston 98. Piston 98 moves in and out of head 87 as the head makes contact with the article. A spring 100 biases the piston out of head 87.

Lift mechanism 19 includes an air cylinder 99 and a piston rod 101. Piston rod 101 is movable along its axis 103 by movement of air into cylinder 99. A pair of inlet ports 105 receive air under pressure for moving piston rod 101 out of cylinder 99. Another pair of inlet ports 107 receive air under pressure for driving piston rod 101 back into cylinder 99. Both inlet ports 105, 107 are driven by air hoses (not shown), as described hereinafter in relation to FIG. 6.

The distal end of piston 101 is connected to T-pipe 97. By forcing air into cylinder 99, piston rod 101 moves vacuum head 87 into close or touching proximity to article 17 on tempering table 13. Vacuum is then utilized to suck article 17 onto head 87. Air is then used to retract piston rod 101 within vacuum cylinder 99 for lifting article 17 vertically upward away from tempering table 13. Vacuum cylinder 99 is securely mounted to the lower side of carriage 47 as illustrated in FIG. 3.

As shown in FIG. 1, a limit switch 109 is secured atop platform 45 in registration for actuation by an arm 111 which is carried by carriage 47. As carriage 47 is driven along guide rods 49, 51 toward tempering table 13, arm 111 engages limit switch 109 for discontinuing operation of stepping motor 69. Carriage 47 thus stops in a home position for positioning vacuum head 87 vertically above the line or article travel of tempering table 13. A second limit switch 113 is similarly positioned atop platform 45 at the other end of the path of travel of carriage 47. Arm 111 also serves to actuate limit switch 113 to stop the stepping motor from driving carriage 47 into carriage support member 55. Limit switch 113 serves as a safety switch.

Figure 4:
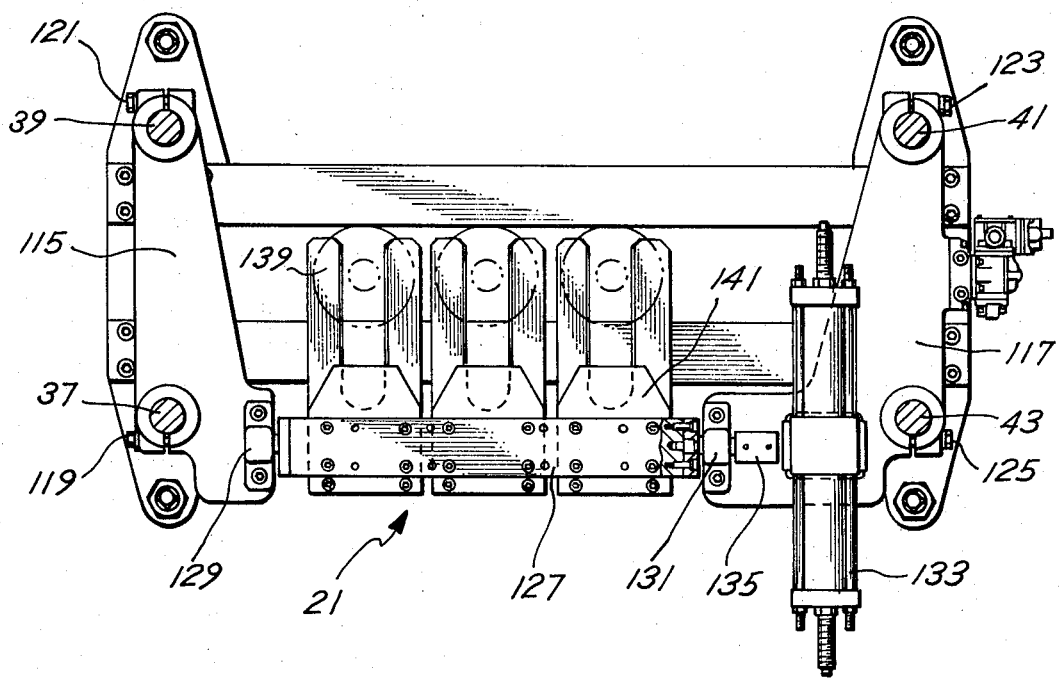
FIG. 4 is a top view of an air turnover mechanism of the extractor and transfer mechanism of FIG. 1.

Referring to FIG. 4, air turnover mechanism 21 is rotatably mounted to a pair of support arms 115, 117 which are slidably mounted to leg members 37, 39, 41, 43. Openings formed in the support arms through which pass leg members 37-43 are tightened by screws 119, 121, 123, 125 in order to fix the position of arms 115, 117 at a fixed height above feet support portions 25.

The turnover mechanism 21 includes a center mount bar 127 which is interconnected between arms 115, 117 and rotatably mounted on pillow block bearing members 129, 131. Bearing member 131 is connected to a piston actuated turnover member 133 via a coupler 135. Turnover mechanism 133 is driven by air and serves to rotate mount bar 127 by 190°.

Turnover member 133 includes a rack and spur gear which rotates coupler 135. A piston within turnover member 135 drives the rack to one extended position, rotating bar 127. Air is then used to return the piston which carries the rack back causing mount bar 127 to return to its normal position.

Figure 5:
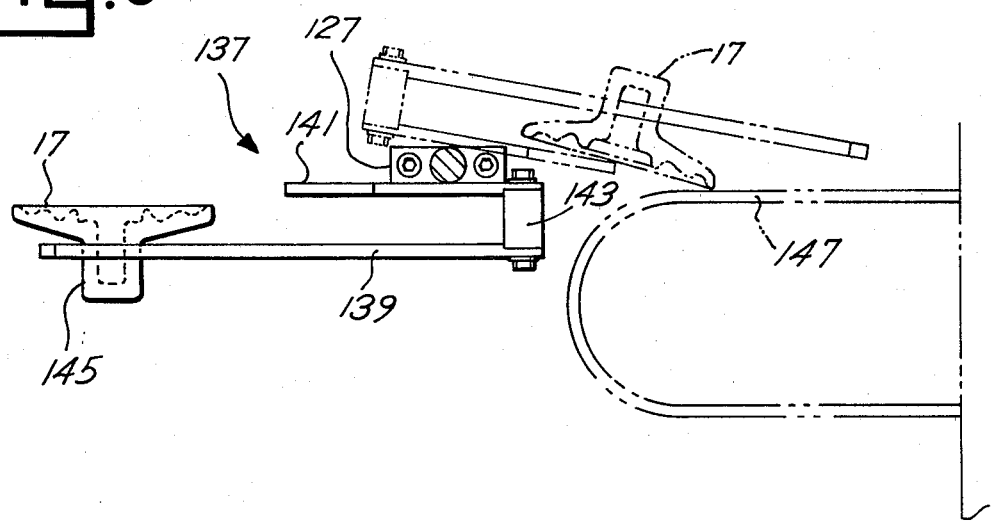
FIG. 5 is a side view of the air turnover mechanism of FIG. 4, showing the mechanism in two positions.

As illustrated in FIG. 5, bar 127 is screw secured to a work holder generally indicated by reference numeral 137. Work holder 137 includes a U-shaped fork bottom member 139 (FIG. 4) and a six-sided top member 141. As shown in FIG. 5, bottom member 139 and top member 141 are spaced apart by a spacer member 143.

The U-shape of lower member 139 permits a top portion 145 of the glass insulator, to pass within the opening of the U-shaped bottom member as the insulator rests on the bottom member. FIG. 5 illustrates the air turnover mechanism in dark lines in its normal resting position for receiving three glass insulators. FIG. 5 illustrates the position of the glass insulator relative to top portion 141 as the insulator is placed on the outer edge of the lower member 139.

FIG. 5 also illustrates the final turnover position of air turnover mechanism 21, as shown in phantom lines. As the turnover mechanism rotates 190° about an axis passing through bar 127, the glass insulator 17 slides within the opening of the U-shaped bottom member 139 passing beneath upper portion 141. As illustrated in FIG. 5, glass insulator 17 is held by the upper portion 141 when the air transport mechanism is in its turnover position. Insulator 17 comes to rest on conveyor belt 147 as shown. Belt 147 pulls insulator 17 from the upper portion 141 as the belt moves along its path to the next work station. After sufficient time has passed for the insulator to be pulled onto belt 147, the turnover mechanism returns to its resting position.

The operation of the system may be described as follows. Stepping motor 69 serves to drive the carriage against limit stop 109. At this point, lift mechanism 19 is driven downward into contact with a glass insulator on tempering table 13.

Figure 6:
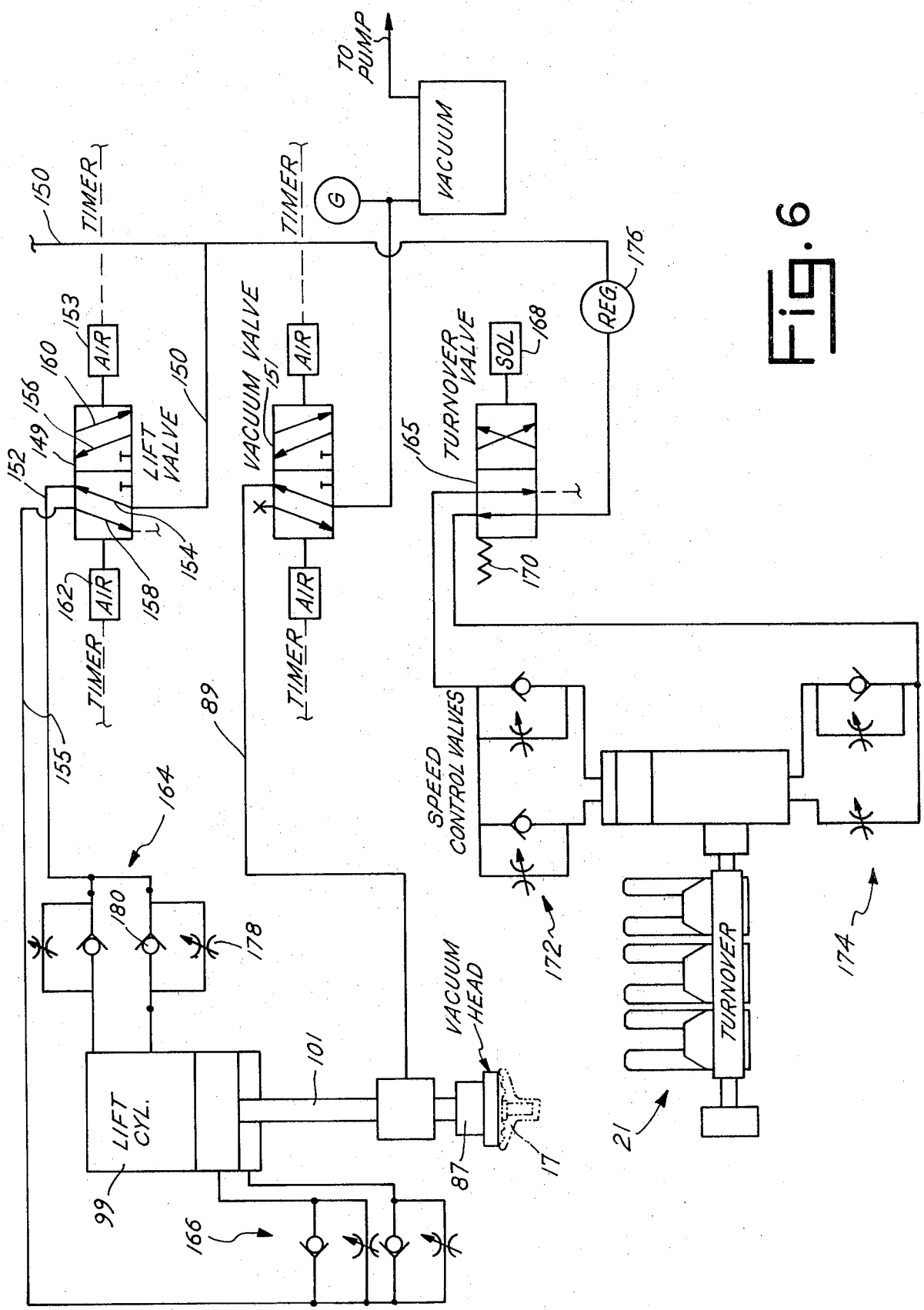
FIG. 6 is a diagrammatic block illustration of the controller of the extractor and transfer mechanism of FIG. 1.

As shown in FIG. 6, a lift valve 149 is operable to pass air to lift cylinder 99 for extending piston rod 101 to its fully extended outward position. Lift valve 149 is shiftable between two positions. In the position shown, air from air source line 150 is connected to air line 152 via valve channel 154. In the second position of lift valve 149, air from line 150 is connected to air line 155 via valve channel 156. Valve channels 158, 160 serve as exhaust channels to the atmosphere for lines 155, 152 respectively.

Lift valve 149 is shiftable onto its two valve positions by air pilots 153, 162. A conventional drum timer (not shown) activates pilots 153, 162 at various times in order to provide air flow into either line 152 or line 155.

A vacuum valve 151 and a turnover valve 165 are operable in a fashion similar to lift valve 149. Valves 149, 151, 165 may be secured at the back of platform 45 (FIG. 1) as shown at 161, 163.

After the carriage has actuated limit switch 109, the drum timer actuates air pilot 153 forcing air along lead 152 and into lift cylinder 99. A pair of speed and cushion controls 164 serve to control the air flowing into the cylinder for extending rod 101 to its fully extended position.

Vacuum valve 151 is next initiated by the drum timer for passing vacuum along channel 89 for sucking article 17 onto vacuum head 87. The drum timer then actuates air pilot 153 for shifting the lift valve in order to connect the air channel to pass air to lead 155. This drives piston rod 101 up into lift cylinder 99 to its fully upright position. A pair of speed and cushion controls 166 control the raising of head 87.

At the next point in time, the stepping motor 69 is actuated by the drum timer triggering a microprocessor controller (not shown). Pulses are transmitted to motor 69 for returning carriage 47 to a position above one of the three U-shaped members of air turnover mechanism 21.

The microprocessor counts the number of steps of stepper motor 69 for controlling movement away from limit switch 109. Three different number of steps are used by the microprocessor such that the articles are positioned in each one of the three portions of air lift turnover mechanism 21. At this point in time, the timer actuates lift valve 149 via pilot 162. The lift cylinder drives the vacuum head to its fully extended position. Vacuum valve 151 is actuated for releasing the insulator 17 onto air turnover mechanism 21. After which lift valve 149 is actuated to drive piston 101 back into lift cylinder 99.

After the three articles 17 have been positioned on air turnover mechanism 21, turnover valve 165 is actuated for rotating air turnover mechanism 21 by 190°. An electric solenoid 168 is actuated by the microprocessor controller after a time which permits conveyor belt 15 to pull the article from between the upper and lower portions of the air turnover mechanism, the turnover valve 155 is actuated to return the air turnover mechanism 21 to its rest position. Solenoid 168 is deactuated and valve 165 returns to the position as shown via spring member 170. Speed control valves 172, 174 are utilized. Also, a regulator 176 serves to control the air pressure passing through the turnover cylinder.

After the turnover mechanism is returned to its rest position, the carriage is driven to limit switch 109 to begin the process once again. As will suggest itself, prior to actuation of the turnover mechanism, the carriage may be driven to a point along its path out of the way of the movement of the air turnover mechanism. The speed control members 164, 166, 172, 174 are conventional components comprising an adjustable orifice 178 which controls the rate of flow of air therethrough, and a check valve 180 which provides free flow of air in one direction and blockage of air in the opposite direction. As will further suggest itself, the drum timer also controls the movement of the tempering carousel in order to synchronize the extractor and transfer mechanism with the carousel table.

It should be understood, of course, that the foregoing disclosure relates to preferred embodiments of the invention and that other modifications or alterations may be made therein without departing from the spirit or scope of the invention as set forth in the appended claims.

What is claimed is:

1. An extractor transfer mechanism comprising:
    a support structure;
    a platform secured to said support structure and extending therefrom for overhanging a work station;
    carriage means mounted with respect to said platform for movement along a predetermined path;
    lift means carried by said carriage means and operable for gripping a workpiece at the work station;
    turnover means disposed relative to said path of said carriage means at an unload position in said path and having means for receiving a work piece from said lift means, said turnover means being actuable for inverting said work piece into a location spaced from said unload position; and
    control means for controlling said carriage means to move between the work station and the unload position, for controlling said lift means to grip a work article at the work station, for controlling said lift means to release a work article at said unload position, and for controlling actuation of said turnover means in coordination with the position of said carriage means,
    wherein said turnover means is positioned below the workpiece for receiving the same under gravity when released from said lift means, said turnover means being rotatably mounted about an axis of rotation for flipping the workpiece, said turnover means including,
    a pair of fingers spaced apart and shaped for supporting the workpiece when released from said lift means, and
    a receptor for holding the workpiece during flipping, said pair of fingers positioned relative to said axis of rotation and shaped for guiding the workpiece into said receptor as said fingers are rotated about said axis, said receptor being shaped for guiding the inverted worked piece under gravity out of said receptor and into said spaced location.

2. An extractor transfer mechanism according to claim 1 wherein said control means includes a timer means for establishing the time of gripping by said lift means.

3. An extractor transfer mechanism according to claim 1 wherein said control means includes a stepper motor for incrementally driving said carriage means between said work station and said unload position.

4. An extractor transfer mechanism according to claim 3 wherein said support structure includes a support platform having an opening formed in its central portion, through which extends said lift means during movement of said carriage means between said work station and said unload position.

5. An extractor transfer mechanism according to claim 4 wherein said support structure includes a pair of parallely spaced follower rods with respect to which said carriage means follows during movement.

6. An extractor transfer mechanism according to claim 5 wherein said control means includes a rotatable lead screw spaced apart from and parallely disposed to said follower rods; and
    connector means connecting said lead screw to said carriage means,
    said connector means moving along the axis of said lead screw as said lead screw rotates.

7. An extractor mechanism according to claim 1 wherein said lift means includes drive means having a control arm movable substantially orthogonal to the path of movement of said carriage means; and a lift head connected to said control arm for gripping a work piece.

8. An extractor transfer mechanism according to claim 7 wherein said lift head is vacuum actuated for vacuum sucking the work piece onto said lift head.

9. An extractor mechanism according to claim 8 wherein said drive means includes a cylinder and a piston mounted for movement within said cylinder, said control arm connected to said piston for movement in conjunction therewith.

10. An extractor mechanism according to claim 1 wherein said tunover means is spaced below said carriage means and wherein said lift means is carried by said carriage means above said turnover means for placement of the work piece onto said turnover means.

11. An extractor mechanism according to claim 1 wherein said pair of fingers are parallely spaced for holding the sides of the work piece and permitting a portion of the work piece to hang between said fingers, whereby an irregularly shaped work piece may be received by said receiving means.

12. An extractor transfer mechanism according to claim 11 wherein said receptor is positioned above said fingers and over a portion thereof, said receptor retaining the work piece with respect to said fingers as said turnover means is actuated.

13. An extractor transfer mechanism according to claim 12 wherein said fingers and said receptor are disposed in a fixed relation for conjoint rotation movement.

* * * * *

UNITED STATES PATENT AND TRADEMARK OFFICE
CERTIFICATE OF CORRECTION

PATENT NO. : 4,452,350

DATED : June 5, 1984

INVENTOR(S) : Ronald Shields

It is certified that error appears in the above-identified patent and that said Letters Patent is hereby corrected as shown below:

Column 3, line 1, after both occurrences of "screw" insert --shaft--.

Column 3, line 68, delete "swith" and substitute --switch--.

Column 8, line 16, delete "rotation" and substitute --rotational--.

Signed and Sealed this

Ninth Day of April 1985

[SEAL]

Attest:

DONALD J. QUIGG

Attesting Officer     Acting Commissioner of Patents and Trademarks